Jan. 7, 1930.  A. K. KIMBERLY  1,743,084
REGISTER OPERATED CASH DRAWER
Filed Aug. 7, 1926  5 Sheets-Sheet 1
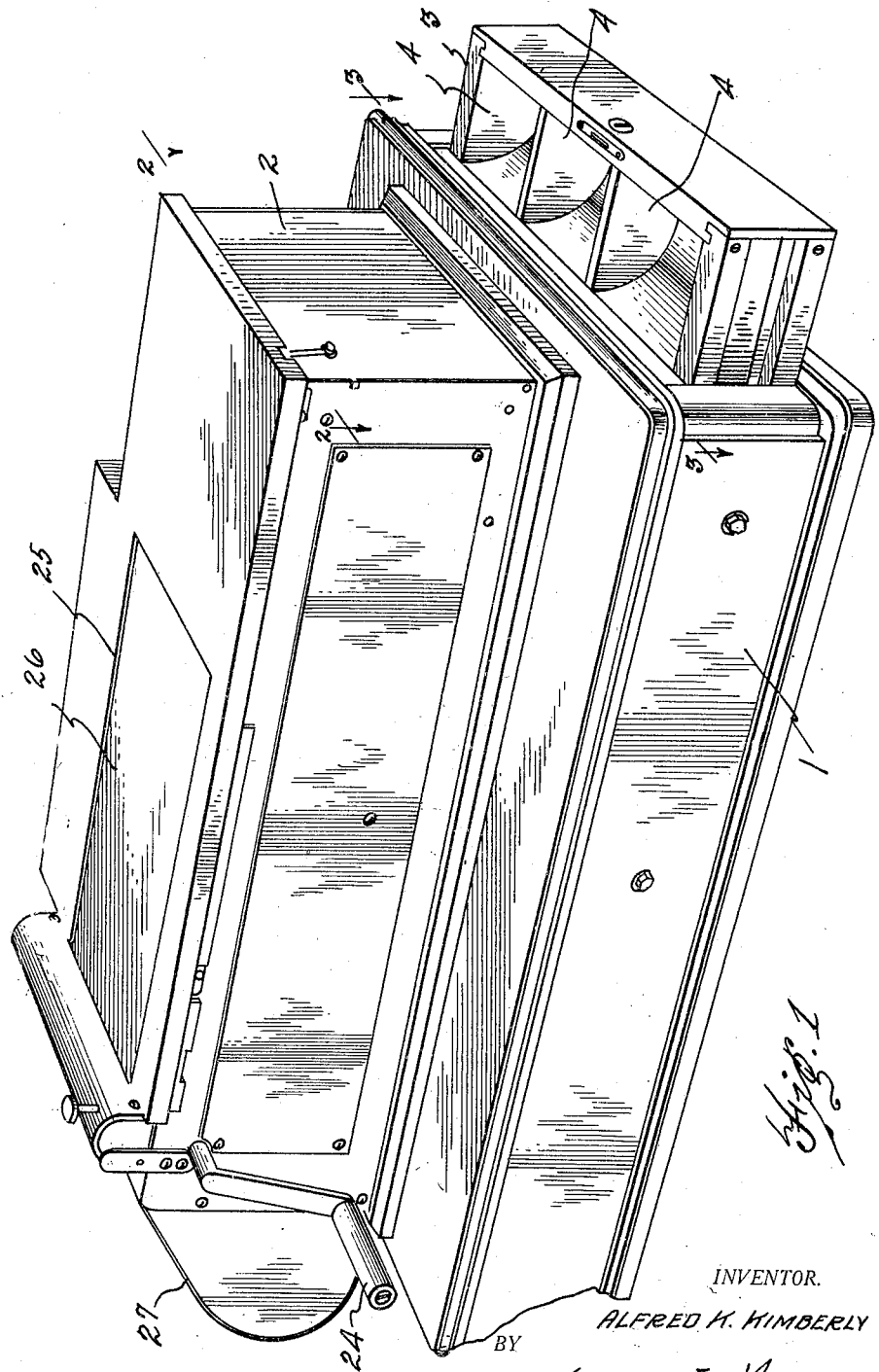
INVENTOR.
ALFRED K. KIMBERLY
BY
ATTORNEY.

Jan. 7, 1930.　　　A. K. KIMBERLY　　　1,743,084
REGISTER OPERATED CASH DRAWER
Filed Aug. 7, 1926　　5 Sheets-Sheet 2
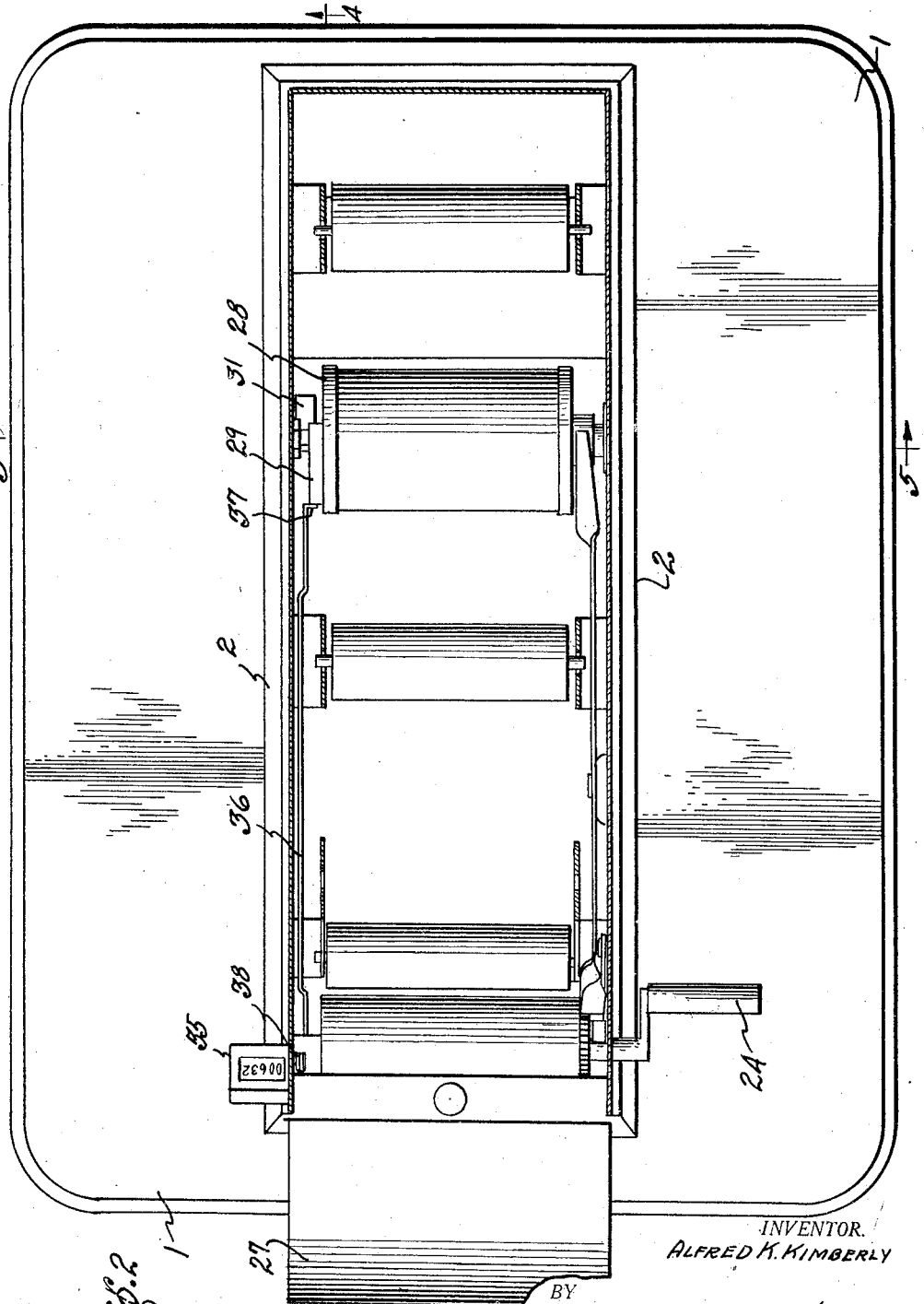
INVENTOR.
ALFRED K. KIMBERLY
BY
ATTORNEY.

Jan. 7, 1930.  A. K. KIMBERLY  1,743,084
REGISTER OPERATED CASH DRAWER
Filed Aug. 7, 1926  5 Sheets-Sheet 3
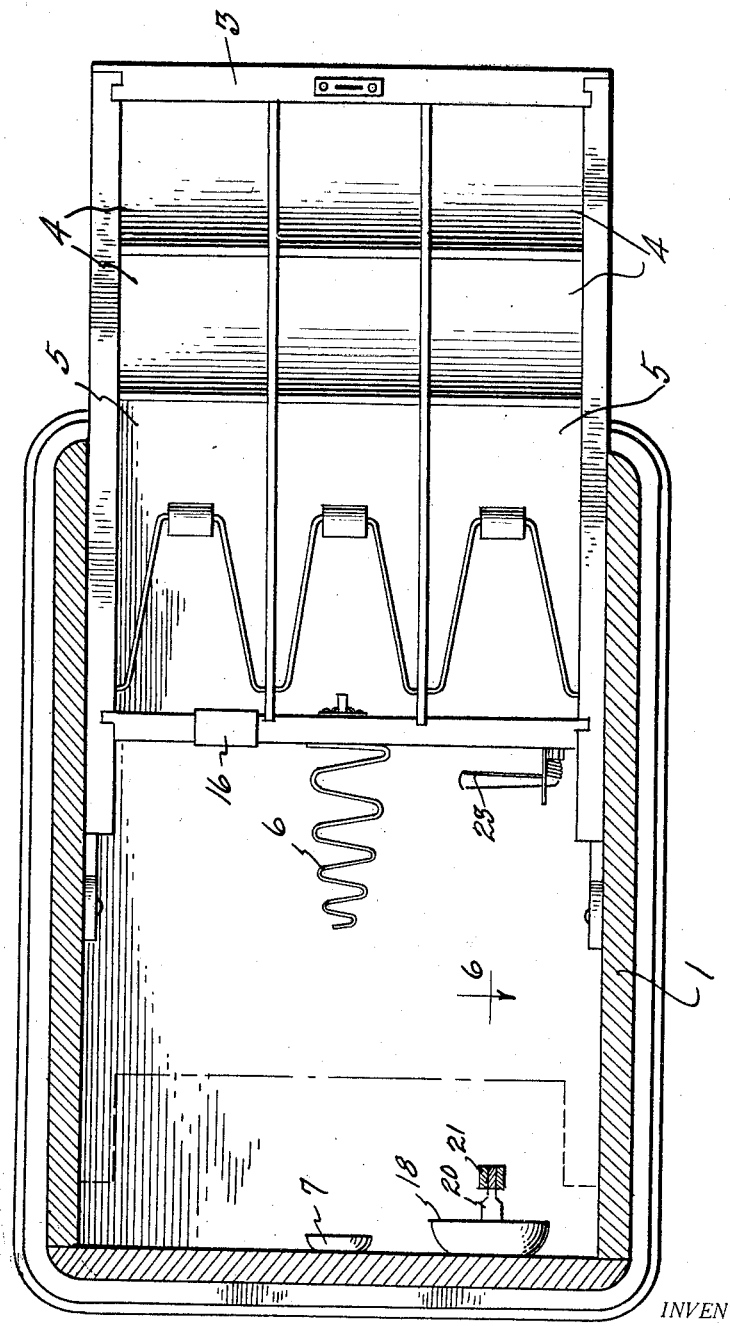
INVENTOR.
ALFRED K. KIMBERLY
BY
ATTORNEY.

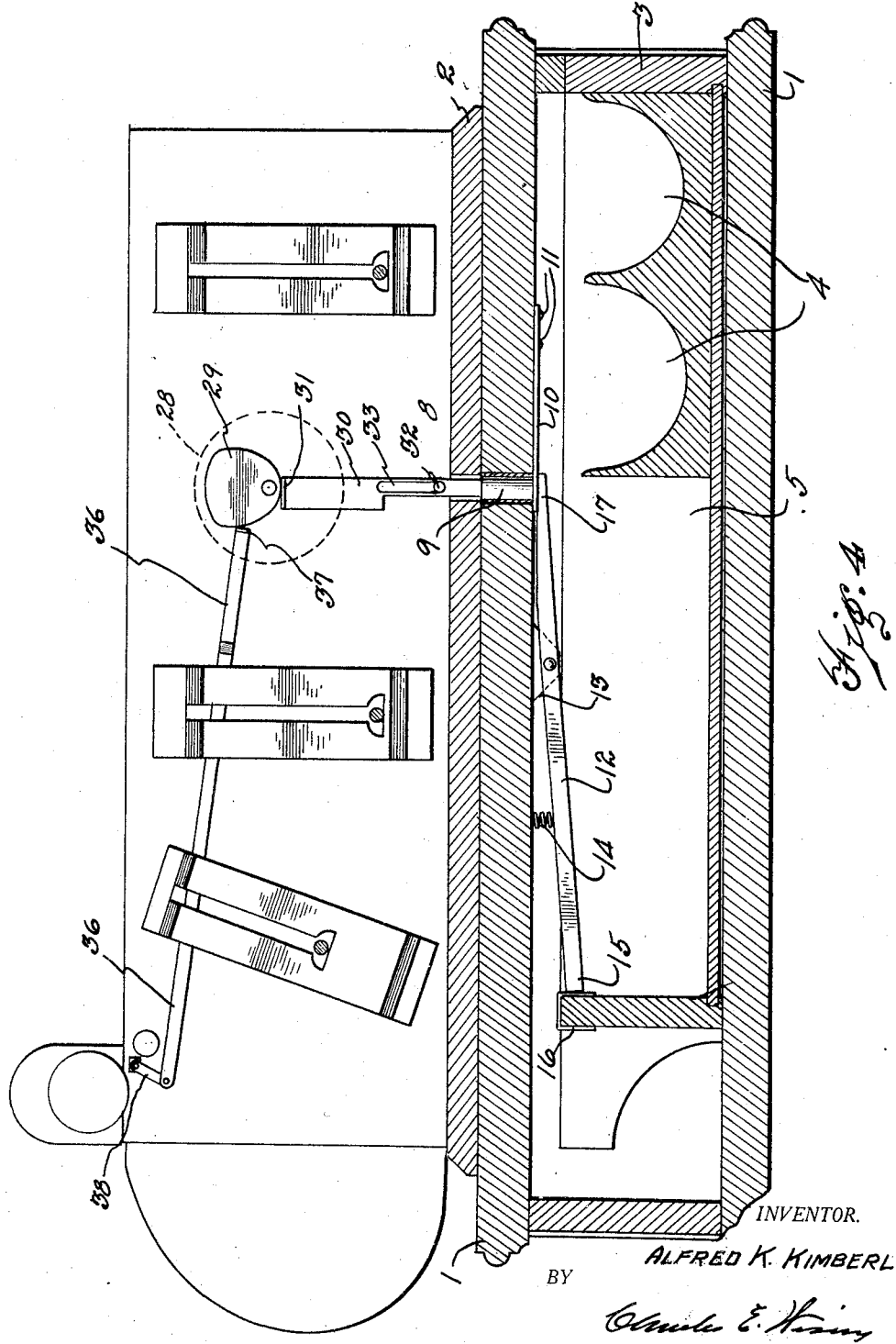

Jan. 7, 1930.    A. K. KIMBERLY    1,743,084
REGISTER OPERATED CASH DRAWER
Filed Aug. 7, 1926    5 Sheets-Sheet 5

INVENTOR.
ALFRED K. KIMBERLY
BY
ATTORNEY.

Patented Jan. 7, 1930

1,743,084

UNITED STATES PATENT OFFICE

ALFRED K. KIMBERLY, OF NEENAH, WISCONSIN, ASSIGNOR TO THE MULTI-PRINT SYSTEM CO., INC., OF NEENAH, WISCONSIN, A CORPORATION OF SOUTH DAKOTA

REGISTER-OPERATED CASH DRAWER

Application filed August 7, 1926. Serial No. 127,755.

This invention relates to cash registers and the object of the invention is to provide a cash register comprising the combination of a recording mechanism and cash drawer arranged so that the cash drawer can only be opened by operation of the recording mechanism.

Another object of the invention is to provide an arrangement whereby a record of each cash sale must be withdrawn before the cash drawer will open.

A further object of the invention is to provide an autographic register arranged for turning out a sales slip the register being arranged to automatically open the cash drawer as the sales slip is turned out.

These objects and the several novel features of the invention are hereinafter more fully described and claimed and the preferred form of construction by which these objects are attained is shown in the accompanying drawings in which—

Fig. 1 is a perspective view of a cash register embodying my invention.

Fig. 2 is a section taken on line 2—2 of Fig. 1.

Fig. 3 is a section taken on line 3—3 of Fig. 1.

Fig. 4 is a section taken on line 4—4 of Fig. 2.

Figure 5:
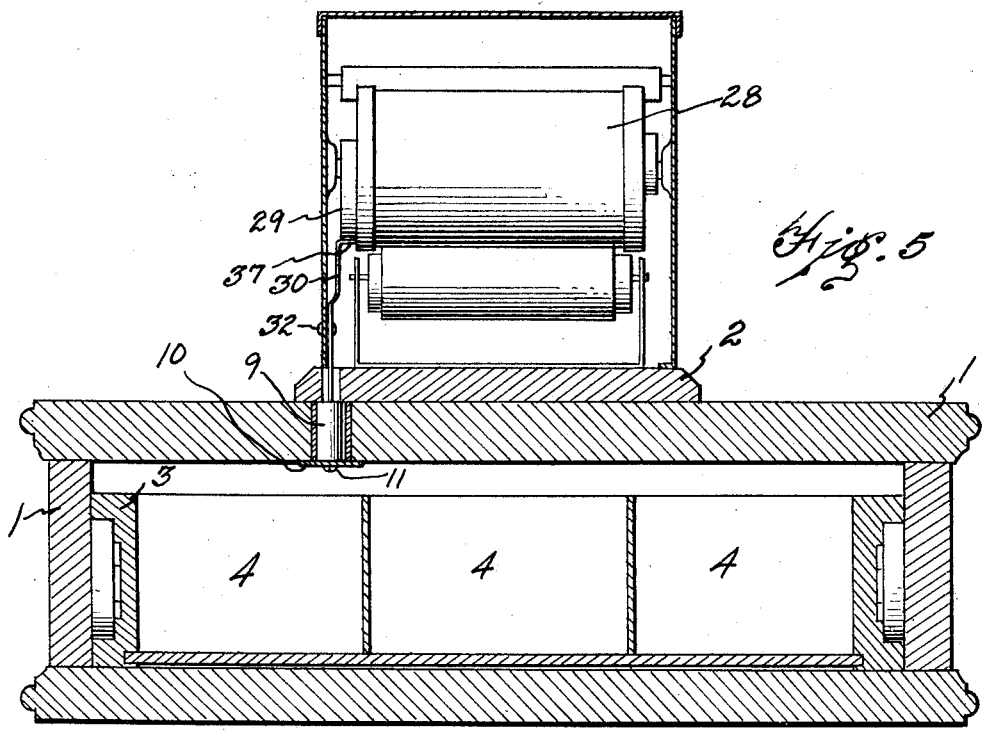
Fig. 5 is a section taken on line 5—5 of Fig. 2.

The device comprises a cash drawer casing 1 on which a recording mechanism such as an autographic register 2 is mounted. A cash drawer 3 is slidably mounted in the casing 1 and as shown in Fig. 3 is provided with compartments 4 for cash and compartments 5 for bills. At the rear end the cash drawer is provided with a coiled spring 6 adapted to seat in the cup 7 shown in Fig. 3 when the cash drawer is closed.

Figure 6:
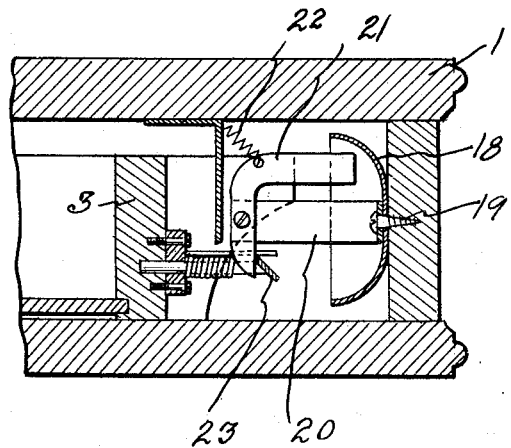
Fig. 6 is a section taken on line 6—6 of Fig. 3.

As shown in Fig. 4 an aperture 8 is provided in the top of the casing 1 and a plunger 9 is positioned in this aperture. A flat spring 10 is secured on the under side of the top of the casing 1 by means of the screws 11 and extends over the bottom of the aperture 8 to prevent the plunger 9 from falling into the cash drawer. An arm 12 is pivotally mounted on the casing 1 on the bracket 13 and a coiled spring 14 depresses the end 15 of the arm 12 into the cash drawer so that the end 15 engages a sheet metal member 16 provided on the end of the cash drawer as shown in Figs. 3 and 4. This arm 12 locks the cash drawer and in the position shown in Fig. 4, the end 17 of the arm 12 is held against the flat spring 10 by the spring 14 which tends to depress the end 15 of the arm 12. By downward movement of the plunger 9 the end of the spring 10 is pressed downwardly which moves the end 17 of the arm 12 downwardly and raises the end 15 above the end of the cash drawer thus allowing the cash drawer to be moved outwardly by the spring 6 which is compressed when the drawer is closed. As shown in Figs. 3 and 6 a bell 18 is secured to the end of the casing 1 by the screw 19 which also supports a bracket 20. A bell crank 21 is pivotally mounted on the bracket 20 and is held against the bell by the spring 22. An actuating member 23 is secured to the cash drawer and as the drawer is thrown outwardly by the spring 6 the member 23 turns the bell crank 21 on its pivot until the member 23 passes off from the end of the bell crank 21 at which time the spring 22 throws the bell crank against the bell and rings the bell as the cash drawer is opened.

In the autographic register the crank 24 shown in Figs. 1 and 2 is turned to feed a series of superimposed sheets or paper strips out of the register. One or more of these sheets are printed in the machine with the same form and an opening 25 is provided in the top of the machine through which the top sheet 26 is exposed to view. When the operator writes on this sheet copies are made on the strips therebeneath by means of interleaved carbon sheets and the lowermost copy is rolled up on a roller within the casing 27 provided on the end of the machine. These paper strips are fed over a type roller 28 which prints the forms on the different strips and the withdrawal of the strips from the machine rotates the type roller which mechanism is described more in a detail in a former Patent Number 1,256,078 issued Feb. 12, 1918.

As shown in Figs. 2, 4 and 5 a cam 29 is secured to the end of the type roll 28 and an actuating member 30 rides in contact with the cam 29. The member 30 is provided with an inturned end 31 which rides in contact with the cam 29 and a guide pin 32 is secured to the side of the register casing and rides in the slot 33 forming a guide for the actuating member 30. The lower end of the actuating member 30 engages the plunger 9 and as the cam 29 is rotated the plunger 9 is moved downwardly to release the cash drawer as hereinbefore described. The cam 29 makes a complete rotation as each complete sales slip is discharged from the end of the machine.

By this arrangement the sales slip 26 shown in Fig. 1 may be filled out with an itemized list of sales at which time the crank 24 may be rotated to feed the sales slips from the end of the machine, a copy of the sales slip on the lower paper strip being rolled up within the casing 27 at the end of the machine. Rotation of the type roller 28 turns the cam 29 shown in Figs. 2, 4 and 5 to depress the member 30 which also depresses the plunger 9 and turns the member 12 on its pivot to release the cash drawer. As the cash drawer is released the mechanism shown in Fig. 6, and hereinbefore described, rings the bell 18. While the cash drawer is opened the operator may make change and then moves the drawer back to the closed position shown in Fig. 4. By this arrangement a permanent record is kept of all cash sales as the lower strip is rolled up within the casing 27.

In order to keep count of the number of sales slips issued a counter 35 is provided on the side of the machine which is of the usual ratchet type and this counter is actuated by means of a lever 36 shown in Figs. 2 and 4, which is provided with an inturned end 37 riding in contact with the cam 29. The opposite end of the lever 36 is pivotally connected to the actuating lever 38 of the counter. By this arrangement upon each rotation of the cam 29 caused by the crank 24 the counter 35 is actuated so that an accurate count is kept of all sales slips issued.

While I have shown an autographic register as the recording mechanism utilized with the cash drawer it is to be understood that an adding machine, a cash register of the visible indicating type or other recording mechanism may be utilized in which a cam is provided and adapted to be rotated by operation of the recording mechanism to release the cash drawer.

From the foregoing description it becomes evident that the cash drawer cannot be opened except by turning out a sales slip and as a copy of these sales slips is kept within the machine the cash drawer and the record of the sales slips may be accurately balanced. By this means petty thievery is prevented and if a blank sales sheet is found on the rolled up strip in the machine it indicates that the drawer has been opened without making a sale. The cover to the autographic register may be also locked in place if desired to prevent the interior of the machine from being tampered with.

Having thus fully described my invention, its utility and mode of operation, what I claim and desire to secure by Letters Patent of the United States is—

1. A cash register comprising a cash drawer, a casing in which the cash drawer is slidably mounted, the casing being provided with an aperture in the top, a recording mechanism mounted on the said casing and having an aperture in the bottom registering with the aperture in the casing, a cam within the recording mechanism adapted to be rotated upon each operation of the recording mechanism, a flat spring mounted within the cash drawer casing and extending across the bottom of the aperture therein, a plunger positioned in the aperture and resting on the said flat spring, a vertically movable arm within the recording mechanism extending through the aperture in the base of the recording mechanism and resting on the said plunger, the flat spring holding the upper end of the vertically movable arm in engagement with the cam, a locking arm pivotally mounted within the cash drawer casing and having one end extending beneath the end of the said flat spring, the other end of the said pivoted arm engaging the cash drawer to hold it in locked position, the arrangement being such that depression of the vertically movable arm by rotation of the cam depresses the plunger and flat spring to turn the locking arm to unlocking position, and a spring for ejecting the cash drawer as it is unlocked.

2. A cash register comprising a cash drawer, a casing in which the cash drawer is slidably mounted, the casing being provided with an aperture in the top, a plunger positioned in the aperture, a flat spring secured to the under side of the top of the casing and extending across the aperture to retain the plunger in the aperture, a locking arm pivotally mounted on the casing and having one end extending beneath the flat spring and adapted to be depressed upon depression of the flat spring by the plunger to unlock the drawer, a spring tending to move the locking arm to position to lock the drawer, a recording mechanism mounted on the said casing and having an aperture in the bottom registering with the aperture in the casing, a cam within the recording mechanism adapted to be rotated upon each operation of the recording mechanism, an arm mounted for vertical movement by rotation of the cam, the lower end of the said arm resting on the aforesaid plunger.

In testimony whereof I sign this specification.

ALFRED K. KIMBERLY.